US006616846B2

(12) United States Patent
Idziak et al.

(10) Patent No.: US 6,616,846 B2
(45) Date of Patent: Sep. 9, 2003

(54) EXTRACTION OF PHOSPHONATES

(75) Inventors: Irene Idziak, Senneville (CA); Amina Benrebouh, Montreal (CA)

(73) Assignee: MDS (Canada) Inc., Montreal (CA)

( * ) Notice: Subject to any disclaimer, the term of this patent is extended or adjusted under 35 U.S.C. 154(b) by 0 days.

(21) Appl. No.: 09/939,718

(22) Filed: Aug. 28, 2001

(65) Prior Publication Data

US 2003/0042204 A1 Mar. 6, 2003

(51) Int. Cl.[7] .............................................. B01D 15/08
(52) U.S. Cl. ...................... 210/635; 210/634; 210/638; 210/656; 210/198.2; 436/161
(58) Field of Search ................................ 210/634, 635, 210/656, 638, 198.2, 659; 423/321.1; 436/161, 178

(56) References Cited

U.S. PATENT DOCUMENTS

| | | | | |
|---|---|---|---|---|
| 3,891,576 A | * | 6/1975 | Battaerd | 260/2.1 R |
| 4,360,776 A | * | 11/1982 | Bauman | 324/316 |
| 4,454,043 A | | 6/1984 | Ting et al. | 210/659 |
| 4,818,683 A | | 4/1989 | Morel et al. | 435/7 |
| 5,057,275 A | * | 10/1991 | Neuman | 422/55 |
| 5,109,074 A | | 4/1992 | Eiffler et al. | 525/340 |
| 5,180,757 A | * | 1/1993 | Lucey | 522/76 |
| 5,208,264 A | | 5/1993 | Ito et al. | 521/32 |
| 5,367,104 A | | 11/1994 | Leupold et al. | 570/211 |
| 5,539,003 A | | 7/1996 | Horwitz et al. | 521/33 |
| 5,593,850 A | | 1/1997 | Wetegrove et al. | 435/7.92 |
| 5,766,478 A | | 6/1998 | Smith et al. | 210/638 |
| 6,391,429 B1 | * | 5/2002 | Senkus et al. | 428/198 |
| 6,482,654 B1 | * | 11/2002 | Cromartie et al. | 436/129 |

FOREIGN PATENT DOCUMENTS

| | | | |
|---|---|---|---|
| WO | WO 91/05259 | 4/1991 | 210/635 |
| WO | WO 00/14538 | 3/2000 | 210/635 |

OTHER PUBLICATIONS

Larive et al, "Separation and Analysis of Peptides and Proteins", Anal. Chem., 1999, 71, 389R–423R.

Fleisch, "Bisphosphonates: Mechanisms of Action", Endocrine Reviews, 19(1): 80–100 undated.

Royer et al., "Determination of Glyphosate and Aminomethylphosphonic acid residues in water . . . Application on Vegetable Matrixes" Anal. Chem., 2000,72, 2312–2322.

Hernandez et al, "Use of Solid–Phase Microextraction for the Quantitative Determination of herbicides in soil and water Samples", Anal. Chem., 2000, 72, 2313–2322.

Gilpin et al., "Pharmaceuticals and Related Drugs", Anal. Chem., 1999, 71, 217R–233R.

Sparidans et al., "Semi–automatic liquid chromatographic . . . with )9–fluorenylmethyl) chloroformate", J. Chromatog. B, 2000, 738, 331.

* cited by examiner

Primary Examiner—Ernest G. Therkorn
(74) Attorney, Agent, or Firm—Rothwell, Figg, Ernst & Manbeck

(57) ABSTRACT

Glyphosate and other phosphonates including the bone resorption-inhibiting bisphosphonates are extracted from samples using immobilized forms of zinc, including zinc methacrylate polymers. The method provides a simple and sensitive method for detecting phosphonates present in aqueous samples, including wastewater and urine.

13 Claims, No Drawings

EXTRACTION OF PHOSPHONATES

BACKGROUND OF THE INVENTION

Field of the Invention

This invention relates to methods and polymeric reagents useful for the extraction and detection of phosphonates present in samples obtained from a variety of environmental and biological sources.

An increasing variety of phosphonic acids and their phosphonate salts have found commercial use in recent years. In the field of agronomy, for instance, N-phosphonomethylglycine, known as glyphosate or Roundup®, has found widespread use as a herbicide, to the extent that its presence in groundwater and in soils has become a matter of environmental concern. Many countries now monitor and regulate the levels at which this herbicide, and its metabolite, aminomethylphosphonic acid (AMP), is present in the environment.

The phosphonates are also becoming widely used in the medical field. Their activity as bone resorption inhibitors, particularly in the form of bisphosphonates, has motivated their use particularly in the treatment of bone disorders such as osteoporosis. Currently, alendronate, etidronate and many other bisphosphonates are approved for commercial use in humans. Other phosphonates have found application as antibiotics, such as fosfomycine, fosfosal, and foscarnet, or as inhibitors of proteolytic enzymes, such as renin and HIV protease. Furthermore, phosphonic acids are found in high concentration in wastewater from textile industries.

There is accordingly a demand for techniques capable of detecting the presence of these and other phosphonates present in samples obtained from different sources.

To provide assays sensitive enough to detect these phosphonates at the very low levels present in most samples, approaches have been developed that utilize a multitude of extraction and enrichment steps to concentrate the analyte, and various chemical treatments to derivatize the analyte, thereby to generate analytical samples that are then subjected to one or more in-line instruments that provide ultrasensitive and either direct or indirect measurement of the phosphonate. U.S. Pat. No. 4,454,043 for instance describes the use of chromatographic columns packed with cation exchange resin, as part of a multi-step procedure for the isolation and detection of glyphosate. Typical of such multi-step procedures is the mass spectrometry-based procedure for glyphosate detection reported by Boyer et al in Anal. Chem., 2000, 72:3826, in which samples are first subjected to column chromatography on ion exchange resins, derivatized with TFAA/NFB, and then subjected to capillary gas chromatography with an ion-trap tandem mass spectrometric detector. Similarly, and as reported by Sparidans et al in J. Chromatog. B., 2000, 738,331, detection of the bisphosphonate known as olpadronate has required a first co-precipitation step of the drug sample with calcium salts, followed by centrifugation and re-dissolving, with each step being repeated at least twice, followed by an ion exchange chromatography step before analysis.

Alternative extraction procedures for phosphonates have been developed more recently, and include the use of immunoaffinity approaches. In WO00/14538, for instance, glyphosate detection is achieved using antibodies raised against a glyphosate conjugate immunogen, in a typical ELISA format.

More suitably, extraction and concentration of such phosphonates, and assays for their detection, would be performed using a rapid and simpler procedure. It is accordingly an object of the present invention to provide an improved process for extracting phosphonates. It is another object of the present invention to provide a polymer useful in such extractions., to permit sensitive and reliable evaluation of samples suspected of containing the phosphonate, whether obtained from human body fluid or from an environmental source.

SUMMARY OF THE INVENTION

In accordance with the present invention, there is provided an affinity-based method for extracting a phosphonate from aqueous solution, which utilizes a polymer-based zinc ligand as solid phase. More particularly, the present method comprises the step of bringing said sample into contact with a polymeric zinc carboxylate under conditions permitting binding between said phosphonate and said zinc. In another of its aspects, the present method comprises the further steps of treating the polymeric zinc carboxylate to release phosphonate bound thereto, and collecting the released phosphonate. In yet another aspect, the present method entails the further step of analyzing the released phosphonate to detect the level thereof present in the aqueous sample.

Also provided by the present invention, in accordance with another of its aspects, is a polymer useful as solid phase in the extraction of phosphonate, wherein the polymer is the reaction product of zinc methacrylate and a suitable crosslinker. In embodiments, the zinc polymer is provided as packing for use in column chromatography, and the present invention thus also provides a chromatographic column having packed therein a zinc polymer of the present invention.

These and other aspects of the invention are now described in greater detail.

DETAILED DESCRIPTION OF THE INVENTION

The invention relates to extraction of phosphonates and phosphonic acids from various sample sources using a zinc polymer as solid phase.

As used herein, the terms "phosphonate" and "phosphonic acid" are used interchangeably with reference to compounds of the formula R—$PO_3^=$ and O-derivatized forms thereof, and includes the bisphosphonates which typically conform to the general formula $^=O_3P$—R—$PO_3^=$, wherein R is selected from a wide variety of radicals. In principle, the present method and polymer are useful to extract any phosphonate that, under binding conditions exploited in the assay, is able to serve as multiple electron pair donor to the immobilized zinc, and is particularly useful to extract phosphonates in which the electron-donating phosphonate oxygen atoms are available for interaction with zinc, as acceptor atom. Non-limiting examples of such phosphonates which can usefully be extracted and detected in accordance with the present methods include the monophosphonates as well as the bisphosphonates, such as glyphosate, its metabolite aminomethylphosphonic acid, and (1-aminobutyl)phosphonic acid, DL-2-amino-3-phosphonopropionic acid (3-phosphono-DL-alanine), DL-2-amino-5-phosphonovaleric acid (DL-5-phosphononorvaline), 4-aminobenzylphosphonic acid, and phenylphosphonic acid, as well as the antibiotics fosfomycin, fosfosal and foscarnet. Examples of bisphosphonates that can useful be extracted and detected by the present method include alendronate, pamidronate, residronate, clodronate, ibandronate, incadronate, neridronate, olpadronate, etidronate, and numerous others. The chemical structures of such compounds are well known, and are reviewed for instance by Fleisch in Endocrine Reviews, 1998, 19(1):80. Common among such phosphonates is the presence in the chemical structure of a zinc-binding oxygen atom, which allows formation of a Zn//O— bond which can be broken by lowering of pH or addition of a chelating agent.

For use as solid phase in the extraction of such phosphonates, and unlike ion exchange resins exploited in other extraction systems, the present invention provides a zinc polymer in which the zinc is presented for binding releasably to the phosphonate to be extracted. The zinc polymer serves as a metal affinity chromatographic polymer, and retains zinc with far greater affinity than the ion exchange resins. The zinc polymer of the present invention is desirably provided as a poly zinc carboxylate, and most desirably as a zinc methacrylate monomer which has been cross-linked using any suitable crosslinking agent. In one embodiment of the present invention, the zinc polymer is the reaction product of zinc methacrylate and ethylene glycol dimethacrylate. In another embodiment of the present invention, the zinc polymer is the reaction product of zinc methacrylate and ethylenebisacrylamide. Alternatively, polymerizing zinc carboxylates other than zinc methacrylate, such as a zinc vinylacetic acid can form the poly zinc carboxylate.

For use as a solid phase in phosphonate extraction, the zinc polymer is most desirably provided in particulate form suitable for use as packing in a chromatographic column. Accordingly, the particulate zinc polymer desirably has a particle size within the range of 20 to 100 microns, although the particle size can of course be varied by alteration of solvent, stirring rates and the like, to obtain particle sizes that achieve desired flow rates and sample residence time, once the format and volume of phosphonate extraction is selected.

In this regard, it will be appreciated that the zinc polymer can also be used in extraction formats other than column-based, including batch formats and fluidized bed formats.

In a preferred embodiment, the chosen extraction format allows for the assay to be performed conveniently on a small sample. Accordingly, in a preferred embodiment, the phosphonate extraction procedure is adapted to be performed on sample volumes as small as about 1 mL or smaller, which can be suitable for instance to extract detectable levels of the bisphosphonates from patients on such therapy. Such a format involves the use, for instance, of cartridges with an inner diameter of 5 mm and a length of 5 cm, containing about 15 mg of zinc polymer. For such cartridges, a flow rate of between 0.1 and 0.05 mL per minute has been found suitable. At such a scale, the present zinc polymer enables detection of phosphonate in samples at very low levels. For instance, detectable levels for aminomethylphosphonate extracted from aqueous solution are linear for concentrations of 1 ng/ml to 1000 ng/mL. Detection of alendronate in urine is at about the 10 ng/mL level without optimization of conditions or process steps. It will thus be appreciated that the present zinc polymer is extremely efficient for the extraction of various phosphonate compounds.

In accordance with another aspect of the present invention, there is provided a chromatographic column packed with the present zinc polymer in particulate form. The type of column, including its size and its chemical composition, can vary. In a preferred embodiment, the column is selected with regard for the propensity of phosphonates to "stick" to labware composed of glass and metal. Accordingly, the column most desirably is formed of either plastic or suitable other polymer.

In use, the zinc polymer serves as a solid phase for the extraction of phosphonates from environmental or biological samples. More particularly, and in accordance with one of its aspects, the present invention provides a method for the extraction of phosphonate, comprising the first step of bringing the phosphonate sample, in the form of an aqueous solution or suspension, and the zinc polymer into contact under conditions permitting binding between the polymer zinc and the phosphonate. Thereafter, unbound sample is then separated from the solid phase zinc polymer, such as by washing, and the solid phase is then treated to cause release of the phosphonate from the solid phase, and the extracted phosphonate is then collected.

The release of bound phosphonate from the zinc polymer can be achieved using various approaches. For instance, release can be achieved by exposing the zinc-bound phosphonate to any suitable chelating agent, such as EDTA or nitrilotriacetic acid, at concentrations suitable for phosphonate release. Alternatively, the lowering of pH, for instance by exposure to inorganic acid, and particularly HCl, is useful to release bound phosphonate from the zinc polymer.

In many instances, preparation of the sample prior to extraction is unnecessary. This is the case, for instance, when the sample to be analyzed is already in an aqueous state, for instance as wastewater, soil run-off, or as a urine or blood sample of biological origin. However, in other situations, the sample is desirably pre-treated to obtain an aqueous sample that can then be subjected to phosphonate extraction. For samples that are not aqueous, including for instance samples of soil suspected of containing glyphosate or its metabolite, pre-extraction with water is useful to produce a suspension. The suspension itself can be introduced to the zinc polymer as such, provided that the particulates are not so prevalent as to cause fouling in the extraction process. In the latter case, and in the case of samples like urine and blood that also contain particulates, it may be useful to separate the insolubles. This can be achieved simply by allowing the particulates to sediment, or can be accelerated for instance with the aid of centrifugation. It may also be useful to pre-treat the sample with chelating agents to strip the sample of any cations that, if present at significant concentration, may interfere with the zinc-based extraction method of the present invention. It will be appreciated that a significant advantage in the sample preparation is that the phosphonates typically are highly water soluble, and are therefore available in the aqueous phase of a prepared sample. Once pretreated, the aqueous and water-soluble fraction of the sample can then be applied to the zinc polymer, and the present phosphonate extraction process performed.

Once extracted and collected, the phosphonate can be retained as a purified phosphonate. Alternatively, and in accordance with another aspect of the present invention, the phosphonate is subjected to analysis, to reveal the level at which the phosphonate is present in the original sample. Accordingly, extracted phosphonate is desirably detected using techniques adapted for the particular phosphonate under investigation. In the case of glyphosate, for instance, detection can be achieved using fluorescence, following derivatization of the glyphosate with o-phthalaldehyde to yield a fluorophore. Thus, detection of glyphosate in a given sample entails optional pretreatment to yield a sample suitable for extraction, followed by extraction using the zinc polymer, release and collection of the zinc-bound glyphosate, derivatization of the released glyphosate, and then fluorescence-based detection of the derivatized glyphosate. The result is then correlated with the original sample volume, to identify the original glyphosate concentration therein.

Embodiments of the invention are now described in the following examples.

EXAMPLE 1

Synthesis of zinc methacrylate-ethylene glycol dimethacrylate co-polymer

Zinc methacrylate (848 mg, 3.6 mmol), ethylene glycol dimethacrylate (678 ml, 3.6 mmol) and the radical initiator VAZO® (1,1'-azobis(cyclohexanecarbonitrile), Aldrich) (20 mg, 0.08 mmol) were dissolved in dimethylformamide (15 ml) in a borosilicate test tube. The solution was sonicated for 1 min and sparged with nitrogen. The test tube was covered with parafilm. The reaction mixture was stirred and placed in an oil bath which was then heated slowly over 1.5 hrs to 95° C. When the reaction mixture reached a temperature of 85° C., a precipitate started to form. Heating was continued for a total of 6 hrs and the polymer was left at room temperature overnight. The white polymer particles were filtered off and extracted with methanol in a Soxhlet apparatus for 8 hrs. The fines were removed by suspending particles in water and discarding the supernatant. This step was repeated until the supernatant was clear. The remaining polymer was filtered off and rinsed with methanol. The polymer was left to dry for 2 hours at room temperature, followed by overnight drying at 140° C.

The polymer was packed in solid phase extraction cartridges (15 mg of polymer in a 1 cc cartridge, fitted with 20 micron PE top and bottom frits).

EXAMPLE 2

Synthesis of zinc methacrylate-N,N'-ethylenebisacrylamide co-polymer

Zinc methacrylate (848 mg, 3.6 mmol), N,N'-ethylenebisacrylamide (50 mg, 0.30 mmol) and VAZO® (20 mg, 0.08 mmol) were dissolved in methanol (3 ml) in a borosilicate test tube. The solution was sonicated for 1 min and sparged with nitrogen. The test tube was covered with parafilm and placed in an ice bath. The reaction mixture was allowed to go to room temperature while being irradiated at 365 nm for 24 hrs. The resulting opaque polymer was scraped out of the test tube and ground in a Retsch RM100 Mortar Grinder for 1 min. The polymer powder was suspended in methanol (25 ml), filtered through a fluted paper filter and washed with methanol (100 ml). The polymer was then stirred up in acetone (50 ml) and allowed to settle for 0.5 hr. The finest particles remained suspended in the supernatant, which was discarded. The polymer was subsequently air-dried at approximately 50° C. for 48 hrs.

The polymer of example 2 was used in batch binding experiments.

EXAMPLE 3

Extraction of Alendronate

Alendronate is representative of a class of bisphosphonate drugs used for the treatment of osteoporosis. In first instance, the affinity of the polymer of example 2 towards alendronate was determined by radioligand assay using a batch format. The polymer (3 mg) was incubated in a polypropylene vessel with 1 ml of deionized water containing radio-labeled alendronate (80 ng ml$^{-1}$) or 1 ml of urine spiked to the same concentration. The polymer was subsequently washed with 1 mL of water, centrifuged, and the supernatant was checked for residual unbound alendronate, and the procedure was repeated. Desorption of the alendronate from the polymer was effected with 0.5 ml of 1.0 M HCl. The desorbate supernatant was analyzed for the presence of alendronate as described above. The results for the urine samples spiked with radiolabeled alendronate were adsorption 95.6%, S.D.=2.1; release 97.3%, S.D.=4.2, duplicate tests for 8 donors.

The binding and release of 'cold' alendronate for the polymer of Example 2 also was quantified by HPLC with fluorescence detection. Solutions of alendronate (1 ml each, with concentrations ranging from 5 ng ml$^{-1}$ to 1000 ng ml$^{-1}$) with pamidronate (100 ng/ml) as internal standard were sonicated with 5 mg of the polymer. The suspension was centrifuged (4,000 rpm for 20 minutes in a Beckman J6-MI) and the supernatant analyzed. No residual alendronate could be detected. The polymer was then washed with water. The bound alendronate was released from the polymer by sonication for about one minute with 1 ml EDTA solution (30 mg ml$^{-1}$). After centrifugation the supernatant was analyzed, showing quantitative recovery of the alendronate. The analyte was derivatized with naphthyldialdehyde/NaCN for detection by fluorescence spectroscopy. Particularly, 100 uL of the alendronate solution was mixed with 10 uL of naphthyldialdehyde (NDA) (0.1 mg/ml in methanol) and 10 uL of NaCN (1 mg/mL in aqueous 1M $Na_2CO_3$). Detection by fluorescence spectrometry at excitation and emission wavelengths of 416 nm and 466 nm, respectively, revealed a response that was linear over 10 ng/mL to 1,000 ng/mL.

Analogous binding tests were performed with alendronate using the polymer of Example 1, used as cartridge packing as described above. Alendronate solutions were filtered through the cartridge. After washing the cartridge with water, the alendronate was eluted with EDTA solution. The analysis results were the same as those obtained from the batch binding experiments.

EXAMPLE 4

Extraction of aminomethylphosphonic acid (AMP)

Binding and release of AMP were tested as follows:

The polymer of example 2 (42 mg) was sonicated with 5 ml of solutions of AMP (1.7 or 8.5 ng ml$^{-1}$). The suspension was filtered and the filtrate was analyzed by HPLC. No residual analyte was detected. The bound AMP was released from the polymer with 5 ml of EDTA solution (12 mg ml$^{-1}$). The AMP was derivatized with naphthyldialdehyde/N-acetylpenicillamine and detected by fluorescence spectroscopy. Particularly, 100 uL of AMP solution is mixed with 10 uL of NDA (0.2 mg/mL in methanol) and 10 uL N-acetylpenicillamine (0.2 mg/mL in methanol) and 10 uL aqueous 1 M $Na_2CO_3$. Detection was as described for alendronate, except using an excitation wavelength of 456 nm and an emission wavelength of 506 nm. The results indicate total release of AMP from the polymer and a linear response from 1 ng/mL to 1,000 ng/mL.

EXAMPLE 5

Extraction of other Phosphonates

The polymer of Example 1 was also used for the extraction of the following:
Glyphosate: (N-(Phosphonomethyl)glycine)
(1-Aminobutyl)phosphonic acid
DL-2-amino-3-phosphonopropionic acid (3-phosphono-DL-alanine)
DL-2-amino-5-phosphonovaleric acid (DL-5-phosphononorvaline)
4-Aminobenzylphosphonic acid, and
Phenylphosphonic acid The adsorption of these compounds by the polymer of Example 1 and Example 2 was tested as follows: 20 mg of polymer was suspended in 1 ml of aqueous analyte solution (1 mg ml$^{-1}$) and sonicated for 1 min. The suspension was allowed to settle for 15 min and the supernatant was tested for the presence of analyte by TLC (ninhydrin dip for all compounds, except permanganate for the phenylphosphonic acid). No residual analyte could be detected. Release of the analytes from the polymer was effected by the addition of EDTA (37 mg, 0.1 mmol), followed by 1 min sonication. The supernatant was tested as described before. The intensity of the colour of the TLC spot after release appeared to be the same as that spotted from the original analyte solution.

We claim:

1. A method for extracting phosphonate from an aqueous sample, comprising the step of bringing said sample into contact with a polymeric zinc carboxylate under conditions permitting binding between said phosphonate and said zinc.

2. A method for extracting phosphonate according to claim 1, comprising the further steps of treating the polymeric zinc carboxylate to release phosphonate bound thereto, and collecting the released phosphonate.

3. A method according to claim 2, comprising the further step of analyzing the released phosphonate to detect the level thereof present in the aqueous sample.

4. The method according to any one of claims 1, wherein the polymeric zinc carboxylate is polymeric zinc methacrylate.

5. The method according to claim 4, wherein the polymeric zinc methacrylate is the reaction product of zinc methacrylate and a crosslinker selected from ethylene glycol dimethacrylate and N,N'-ethylenebisacrylamide.

6. The method according to claim 5, wherein the crosslinker is ethylene glycol dimethacrylate.

7. The method according to claim 4, wherein the phosphonate bound to the polymeric zinc carboxylate is released by addition of a chelating agent.

8. The method according to claim 4, wherein the phosphonate is a bisphosphonate.

9. The method according to claim 4, wherein the phosphonate is a monophosphonate.

10. The method according to claim 4, wherein the phosphonate is glyphosate.

11. A method for detecting phosphonate in an aqueous sample, comprising the steps of:

(1) bringing said sample into contact with a polymeric zinc methacrylate to permit binding of the phosphonate thereto;

(2) removing unbound sample;

(3) treating the polymeric zinc methacrylate to release phosphonate bound thereto (4) collecting the phosphonate so released, and (5) subjecting the collected phosphonate to analysis to determine the presence of level of phosphonate present therein.

12. The method according to claim 11, wherein the polymeric zinc methacrylate is zinc methacrylate-ethylene glycol dimethacrylate co-polymer.

13. The method according to claim 12, wherein said polymeric zinc methacrylate is present as packing within a chromatographic column.

* * * * *